United States Patent Office 3,272,691
Patented Sept. 13, 1966

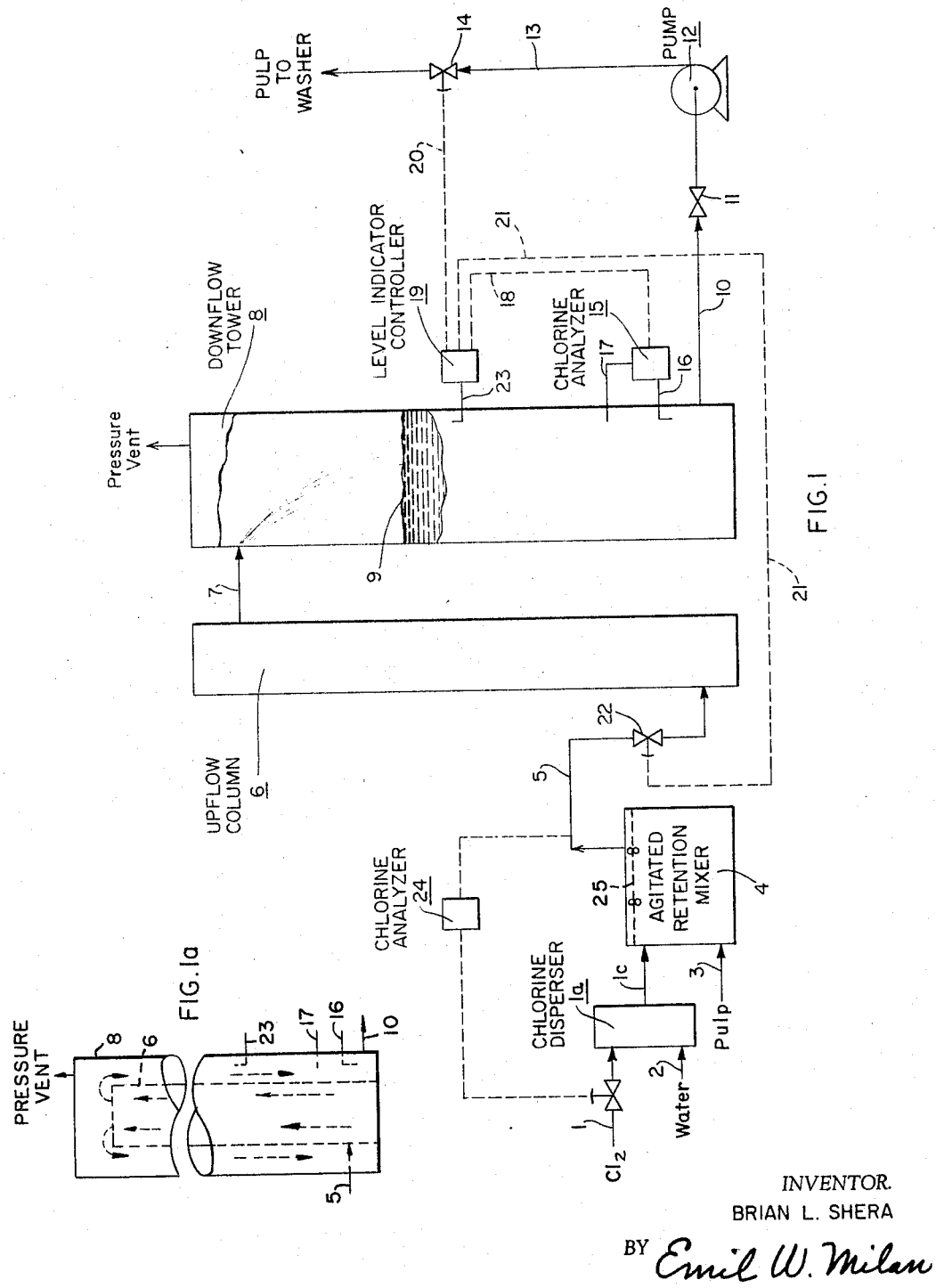

3,272,691
APPARATUS FOR CONTINUOUSLY CHLORINATING PULP INCLUDING AUTOMATIC CONTROL OF THE DEGREE OF CHLORINATION
Brian L. Shera, Tacoma, Wash., assignor to Pennsalt Chemicals Corporation, Philadelphia, Pa., a corporation of Pennsylvania
Filed Feb. 12, 1964, Ser. No. 344,433
4 Claims. (Cl. 162—252)

This invention relates to an apparatus and process for continuous chlorination of cellulosic pulp. Particularly, it relates to an apparatus comprising in combination chlorine gas dispersion means, chlorine gas-pulp stock mixing and retention means, an upflow chlorination means, a downflow chlorination retention means and control means for said various means. Still more particularly, it relates to a continuous chlorination process whereby the chlorination bleaching of wood pulp stock is carried out utilizing a combination of steps including chlorine gas dispersion, agitated contacting of pulp stock with the dispersed chlorine gas under recycling conditions, and controlled chlorination based on an upflow-downflow chlorinating procedure in cooperation with chlorination endpoint determination and flow control.

The bleaching of cellulose pulp is a combination of chlorination, extraction and oxidation stages. Chlorination of unbleached cellulose pulp tends to solubilize colored lignin materials in the pulp which are undesirable in the finished product. This invention is directed only to the first, or chlorination, stage.

The treatment of pulp with chlorine converts colored lignin materials to chlorinated lignin derivatives which are partially soluble in acidic chlorine solution and particularly soluble in subsequent alkaline extraction liquors. During the chlorination stages, it is desirable that oxidation reactions with the cellulose be kept to a minimum since oxidation of the cellulose will cause degradation of the cellulose pulp with resulting loss of yield and strength. Prolonged exposure of cellulosic pulp to the action of active chlorine and heat beyond the initial chlorination stage results in the above degradation of the pulp.

Accordingly, it is prudent to remove and wash pulp as soon as the active available chlorine has been consumed. Active available chlorine is distinguished from the residual chlorine as normally titrated which consists of chlorolignins and other loosely combined chlorine compounds. Chlorinated pulp must not remain in a strongly acid state, such as develops in the chlorinated pulp mass during chlorination, because hydrolysis of the cellulose is formed by such state. The invention provides a means and method for minimizing both degradation and hydrolysis while improving the chlorination of the pulp.

In the chlorination of kraft pulp, the chlorine application commonly is from 6 to 7.5% by weight based on the weight of pulp, the pulp generally being in the form of fibres suspended in water. Volumetrically, the relative volume of chlorine gas to volume of pulp stock at the point of application is 1:4, i.e. one volume of gas to four of paper stock (including the water).

Chlorine gas dissolves relatively slowly in water. This, as is known, presents difficulties in dissolving the relatively high volume of chlorine gas in the water and contacting the fibres with the dissolved chlorine gas. Dispersion of the chlorine in the water in the form of fine chlorine gas bubbles therefore is highly desirable and advantageous in order to get a large volume of chlorine gas into contact with the wood fibres. Dispersers for this purpose are available on the market.

However, contacting the dispersed chlorine gas with the wood fibres presents a separate problem. This problem is overcome by a retention chlorinator mixer provided with agitation means and which holds the mass of wood fibres, water and chlorine gas sufficiently long in the mixer to ensure adequate dispersion and contacting of the fibres with the chlorine gas. Such mixer means are available on the market.

The next phase in the chlorination stage involves retention of the wood fibres and chlorine gas in the stream in contact with each other while the chlorination of the lignin materials occurs. The customary bleach plant chlorination practice is to introduce the stream of pulp stock and chlorine gas to the base of a vertical retention tower where the chlorination is carried on as the mass slowly rises to the top of the tower. The pulp stock, after a varying retention period, discharges over a launder ring or through a conical section of the upper part of the tower to a conventional washer where the acid byproducts from the chlorination are washed away. The time of retention in the tower may vary from under an hour to two hours or more, due to variations in the efficiency of chlorination, conditions of contacting and differences in raw wood stock.

The customary type of plant practice may be characterized as an upflow chlorination process. Such upflow process is subject to several shortcomings which affect adversely the quality of the chlorinated pulp. These shortcomings include improper dispersion of the chlorine gas in water, inadequate distribution of chlorine gas throughout the pulp stock, inadequate contacting period, channeling of chlorine gas in the chlorination tower, and prolonged contact of pulp with chlorine at high retention temperatures, with subsequent uneven retention periods and uneven pulp treatment for different portions of the same mass. The combination of the above factors results in considerable variation in the quality and uniformity of the chlorinated pulp and the final bleached pulp product. Lack of chlorination control during the chlorination stage is evidenced by wide fluctuations in quality of caustic extracted pulp, resulting in kappa numbers ranging from 5.0 to 8.0 and 1% cupriethylenediamine (cuene) viscosities of 70–300 cp. (TAPPI standards T236 m–60 and T230 sm–50.) The kappa number is particularly significant as it is indicative of the relative hardness, bleachability, or degree of delignification of pulp. The lowest kappa numbers and viscosities are invariably associated with low chlorinating rates and high retention times.

It is known that under normal conditions the chlorination rate of wood pulp is very rapid. For example, 87% of the chlorine applied to wood pulp stock at 77° F. is absorbed in five minutes and virtually all the applied chlorine has reacted with the pulp in about 30 minutes. Acid hydrolysis of the carbohydrate fraction of the pulp, however, will continue throughout the length of the retention period, causing degradation of the stock. Also, since long retention times result in low mass velocity of the pulp in the tower, the formation of chlorine pockets in the mass is promoted and results in wasteful channeling of chlorine gas by the pulp particles and out of the tower.

This invention is directed to the chlorination of pulp by means and under conditions which result in an optimum rate of chlorination of the pulp with a minimum retention time and resultant minimum degradation in the chlorination stage.

The process of this invention comprises as particularly essential steps continuously introducing a flowing aqueous stream of cellulosic pulp mixed with at least a chlorinating amount of finely dispersed chlorine gas in water into a bottom section of an upflow chlorinator means, preferably a column, flowing said stream up said means under ambient chlorinating conditions of temperature and pressure, discharging the stream from an upper section of said upflow means into an upper section of a downflow chlorinator retention means, preferably a tower having a bottom outlet and being of greater capacity than said upflow means, accumulating said stream in said downflow means under ambient chlorinating conditions of temperature and pressure for a period of time at least sufficient, but not substantially longer than that sufficient, to complete the desired degree of chlorination of the portion of the pulp standing in the column substantially at the level of said outlet, as indicated by determining the degree of chlorination using a chlorination determining means, e.g. oxidation-reduction potential measurements or available chlorine content, flowing a stream of the chlorinated pulp through said outlet, and adjusting the inflow of the stream of pulp into the whole system and particularly said downflow column to a rate substantially equal to the rate of outflow of said chlorinated pulp through said outlet.

The apparatus used in the practice of this invention preferably comprises in combination chlorine gas disperser means; agitated retention chlorinator mixer means; upflow chlorinator means, preferably an upflow chlorinator column; downflow retention chlorinator means; chlorination endpoint determining means and level control means associated with said downflow means; and input control means to control pulp stock flow to said upflow means.

The chlorine gas disperser is provided with dispersing means, e.g. an eductor, for dispersing chlorine gas into fine bubbles in water. The retention mixer is provided with means, e.g. a propeller, for agitating the contents of pulp, water and dispersed chlorine gas and is capable of retaining a flowing portion of mass for a relatively prolonged retention period, e.g. at least about 1½ minutes, and preferably from 1½ to 5 minutes.

The retention chlorinator mixer is provided with inlets for an aqueous stream of cellulosic pulp and a stream of dispersed chlorine in water from the chlorine disperser. The mixer is provided with an outlet for the agitated stream of pulp, the outlet being connected to an inlet in the lower section of the upflow chlorinator means. The upflow chlorinator means preferably is provided with input control means, e.g. an air-actuated diaphragm valve, for controlling the input of pulp stock to said first means. The input control means preferably is actuated by a liquid level indicator and control means associated with the downflow retention chlorinator means. The upflow chlorinator means has an outlet for the pulp stream in the upper section of said means, said outlet being arranged to discharge into the upper section of said downflow retention chlorinator means.

The downflow retention chlorinator means has an outlet for the pulp stream in the lower section of said means and is provided with chlorination endpoint determination means, preferably means for determination of the presence or absence of available chlorine in the chlorinated pulp in the pulp stream. The chlorination endpoint determination means is connected by signal lines, preferably electrical, to liquid level indicator and control means for controlling the level of the pulp stock in the downflow retention chlorinator means and for controlling the input control means for the pulp stock flow to the upflow means. The chlorinated pulp stream from the outlet of the downflow retention chlorinator means is controlled by the chlorine endpoint determining means and the liquid level indicator and control means to leave said downflow means when the available chlorine present in the pulp stock about to leave the latter means is substantially zero.

In the drawing, FIG. 1 is a schematic view of a preferred apparatus embodiment in accordance with the invention and shows an upflow column exterior to the downflow tower.

FIG. 1a is a schematic view showing that portion of an apparatus embodiment in accordance with the invention in which the upflow column is located within the downflow tower.

In the drawing, the same parts in each figure are referred to by the same numbers.

According to FIG. 1, chlorine gas, water, and wood pulp are introduced through lines 1 and 2, respectively, to a chlorine dispenser 1a provided with internal means for dispensing the gas in the form of small bubbles in the water. The dispersed chlorine passes through line 1c to a retention mixer 4 where it is mixed by means of an agitator 25, e.g. a propeller, with wood pulp and water from line 3. The mixed stream of pulp, water and chlorine gas passes through line 5 and valve 22 into the bottom of upflow column 6. The stream rises in upflow column 6 and overflows through line 7 into downflow tower 8. The stream of pulp, water and chlorine gas accumulates in downflow tower 8 to a level about as shown, for example, at 9. The level is dependent upon the chlorine content measurements of the pulp, determined as substantial absence of available chlorine, that is active chlorine, substantially at the level of outlet line 10 in the tower 8. Chlorinated pulp passes through line 10, valve 11 and pump 12 into line 13 through valve 14 and discharges to a pulp washer, not shown.

An example of such means, which includes a signalling means, is a Wallace & Tiernan Residual Recorder-Controller shown in the manufacturer's catalog file 40.189 (revision 5–62, copyright 1962 to Wallace & Tiernan, Inc., Belleville 9, New Jersey).

A chlorine analyzer 15 continuously analyzes for available chlorine content a stream of pulp entering the analyzer through line 16 and returning to the tower through line 17. When the available chlorine present in the pulp entering at line 16 is substantially zero, indicating substantial completion of the chlorination step, the analyzer 15 signals through line 18 to level indicator and controller 19, which through line 20 controls the operation of valve 14, holding valve 14 in open position. With valve 14 is an open position, the chlorinated pulp flows from downflow tower 8 through line 10 to pump 12 and to the pulp washer. When the active chlorine content is indicated as being greater than zero at the analyzer, valve 14 closes, shutting off the flow of pulp from the tower 8, thus holding the pulp for continued chlorination. Level indicator controller 19 then signals through line 21 to inlet valve 22 on line 5 through which pulp is flowing to the upflow column 6. The valve 22 is closed when the level of pulp in downflow tower 8 reaches a predetermined upper level 9, signalled through line 23 to controller 19. The level 9 in tower 8 is thus controlled substantially at about a uniform height in the tower depending on the signals received from the level indicator controller 19 and the chlorine analyzer 15, respectively. A separate chlorine analyzer 24 is connected between valve 25 of the chlorine line 1 and line 5 from the retention mixer to the upflow column 6. This analyzer 24 controls the chlorine content of the pulp in retention mixer 4 and in the pulp moving to the upflow column 6. While the flow to upflow column 6 is shown as controlled by valve 22 on line 5, the flow can also be arranged to be controlled ahead of the retention mixer 4 by appropriate valving.

The process of this invention can be used for the chlorination of all types of cellulosic material, particularly wood pulps including Douglas-fir kraft, western hemlock kraft, calcium-base sulfite, ammonium-base sulfite, southern pine kraft and southern hardwood kraft.

While the preferred embodiment shown in the drawing shows upflow column 6 outside of downflow column tower 8, it is to be understood that the process can also be practiced in a tower in which the upflow column is positioned, preferably concentrically, within the downflow tower. This arrangement is particularly advantageous in that it permits the conversion and use of many existing large capacity upflow chlorination towers for the application of the upflow-downflow steps of this invention.

The invention and its practice are further illustrated by the following example.

A 12 x 70 foot retention chlorination tower was converted to the upflow-downflow principle by installing a 7 foot interior diameter by 36 foot high upflow column concentrically within the larger tower. The combination upflow-downflow tower was provided with a level indicator controller and a chlorine analyzer similar to those shown in the drawing, with an outlet line leading from the bottom of the tank to a pump leading to the chlorinated pulp washer also much as shown in the drawing. The upflow column of the combination tower was provided with a bottom inlet which in turn was connected to the outlet of an agitated retention mixer to which dispersed chlorine gas, water and pulp were supplied much as shown in the drawing. Chlorine gas and water at ambient temperature, about 75–80° F., were fed to the disperser in the ratio of about 2½ to 3 gallons of water per pound of chlorine. A pulp stock composed of a 50–50 mixture of Douglas fir and western pine species cooked by the kraft process was fed to the retention mixer, at a 3% by weight pulp stock concentration. The chlorine gas in the form of a fine dispersion of bubbles in water was fed to the pulp stock in the retention mixer in the ratio of about 1 to 1.2 cubic feet per second of gas to 5 cubic feet per second of pulp stock. The retention mixer was equipped with horizontally mounted propellers and baffles and was of such capacity that the pulp was recycled by means of the propellers within the mixer about 4 to 6 cycles. The pulp was retained in the mixture for about 1½ minutes from time of entering the mixer until discharge to the upflow column. The stream of intimately mixed pulp, water and chlorine gas entered the bottom of the upflow column and passed upward at a velocity in the 7 foot diameter tube of about .09 foot per second. On reaching the top of the upflow column, the stream overflowed and accumulated in the annular space between the outer wall of the upflow column and the inner wall of the downflow tower. At a throughput rate of 28,000 pounds of pulp per hour, the annular ring was nearly full of pulp stock up to the top of the inner column. At a flow rate of 10,000 pounds of pulp per hour, the level of pulp stock in the annular ring was about 4 feet from the bottom of the downflow tower. A relief valve was provided at the top of the outer tower for venting and breathing purposes.

In operating the modified, i.e. combined upflow-downflow, tower, a retention time of about 20 minutes was found adequate for completion of chlorination and was maintained during the operation of the tower. Previously pulp retention had lasted from about 40 minutes to two hours depending upon the consistency of the pulp, before releasing the pulp to the washer resulting in erratic subsequent bleaching and pulp quality.

Table I summarizes the experiences obtained for a two-week operating period preceding the tower modification and compares them with those obtained for a similar two-week period following the modification. During both periods the bleaching rate varied from 10,000 to 22,000 lbs. of pulp per hour.

In Table I the kappa number of caustic extracted pulp after conversion indicates substantial improvement in the uniformity of chlorinated pulp. As can be seen, the kappa number of caustic extracted pulp after chlorinating had an over-all range of 1.6 after the conversion as compared to a range of 3.0 before the conversion. Average kappa number after chlorinating was 7.2 compared to 7.5 before. More importantly the percent of chlorine usage, or demand, was reduced from 56 to 47 percent, representing a 16 percent reduction in the chlorine consumption. The decrease in chlorine consumption is attributed to a combination of improved contacting of pulp and chlorine in the entire chlorinating system and particularly elimination of chlorine channeling in the retention tower by use of the downflow tower in conjunction with the upflow column. The overall chlorine savings resulting from the tower modification amounted to 26 pounds of chlorine per ton of pulp. At an average bleaching rate of 360,000 pounds per day of pulp, 320 days per year, the savings in chlorine consumption amounted to 1½ million pounds of chlorine per year. This unexpected saving in chlorine consumption in addition to the high uniformity of chlorination of the pulp show the significance to the art of the improved means and method of this invention.

The process and apparatus of this invention provide a method and means whereby chlorine is effectively dispersed in water, the dispersed chlorine is effectively mixed with pulp stock, and the chlorine-containing pulp stock is retained for an optimum time, i.e. the shortest practical time, in a retention tower under conditions which avoid excessive chlorination of the pulp, avoiding waste of chlorine and degradation of the pulp stock. The process and apparatus are especially advantageously used in areas where plant water may be high in temperature, particularly during hot summer seasons. The process and apparatus can be advantageously used in the temperature ranges normally encountered, such as 45° to about 95° F. The time during which the pulp stock is exposed to the action of available chlorine is reduced from periods of as much as two hours down to periods of less than half an hour. Moreover, by means of the downflow means and by operating the process by use of a downflow step, the problem of gas pockets and gas channeling is eliminated.

Many widely different embodiments of this invention may be made and many process and apparatus variables obvious to those skilled in the art may be introduced without departing from the scope and spirit thereof and it is to be understood that my invention includes all such embodiments and is not to be limited by the above descriptions.

TABLE I.—CHLORINATION DATA BEFORE AND AFTER TOWER REVISION

|  | Avg. unbleached pulp kappa No.* | Cl₂ addition | | Residual Cl₂, lb./ton | Kappa No. of caustic extracted pulp* | | |
| --- | --- | --- | --- | --- | --- | --- | --- |
|  |  | Percent of o.d. pulp | Percent of Cl₂ demand |  | Daily range | Over-all range | Avg. |
| Before | 39.0 | 7.2 | 56 | 7 | 0.8 | 3.0 | 7.5 |
| After | 37.8 | 5.9 | 47 | 12 | 0.4 | 1.6 | 7.2 |

*TAPPI standards T236 M-60.

I claim:

1. Apparatus for continuously chlorinating cellulosic pulp comprising in combination chlorine gas disperser means having inlets for chlorine gas and water and an outlet for dispersed chlorine gas;

retention chlorinator mixer means connected to the outlet of said disperser means and having an inlet for said pulp suspended in water; said mixer means being provided with agitator means and being of sufficient capacity to retain an ingoing portion of the pulp in contact with dispersed chlorine gas entering said mixer means from said dispenser means in said mixer means for a period of at least about 1½ minutes; said mixer having an outlet for said pulp;

upflow chlorinating means having a bottom inlet connected to the outlet of said mixer means to receive pulp from said mixer means and having an outlet for said pulp in its upper section;

downflow chlorinator retention means having an upper section arranged to receive pulp discharged from said upflow chlorinator means; said downflow means being larger in capacity than said upflow means; said downflow means being provided with an outlet near its bottom section;

chlorination endpoint determination means including signalling means disposed at the lower level of said downflow means to substantially continuously test pulp at said lower level to determine attainment of a predetermined chlorination state of said pulp;

liquid level indicator and controller means associated with said downflow means and arranged to receive signals from said determination means;

outlet control means associated with the outlet of said downflow means and connected to said controller means to respond to signals from said determination means;

said determination means cooperating with said controller means and said outlet control means to retain pulp in said downflow means until a predetermined chlorination endpoint has been attained and the opening said outlet means to discharge chlorinated pulp from said downflow means, thereby maintaining the level in said downflow means substantially constant and limiting retention of said pulp in said downflow tower to a period at least sufficient but not substantially longer than sufficient to attain the desired endpoint of chlorination.

2. The apparatus of claim 1 wherein the retention chlorinator mixer means comprises horizontally mounted propeller means.

3. The apparatus of claim 1 wherein the upflow means is external to the downflow chlorinator means.

4. Apparatus according to claim 1 in which the upflow means is located within the downflow chlorinator means.

References Cited by the Examiner

UNITED STATES PATENTS

| | | | |
|---|---|---|---|
| 1,530,494 | 3/1925 | Heiskanen | 68—27 X |
| 1,942,622 | 1/1934 | Traquair et al. | 162—238 |
| 2,198,709 | 4/1940 | Tomlinson | 68—27 |
| 2,307,137 | 1/1943 | Kennedy | 162—49 X |

DONALL H. SYLVESTER, *Primary Examiner.*

S. LEON BASHORE, *Examiner.*